July 12, 1927.

A. R. MORRILL

SEWING MACHINE

Filed Oct. 11, 1919

1,635,856

12 Sheets-Sheet 5

July 12, 1927.

A. R. MORRILL

SEWING MACHINE

Filed Oct. 11, 1919   12 Sheets-Sheet 8

1,635,856

Witness
John J. Elbury

Inventor
Alfred R. Morrill
by his attorneys
Van Buren Fish & Hildreth

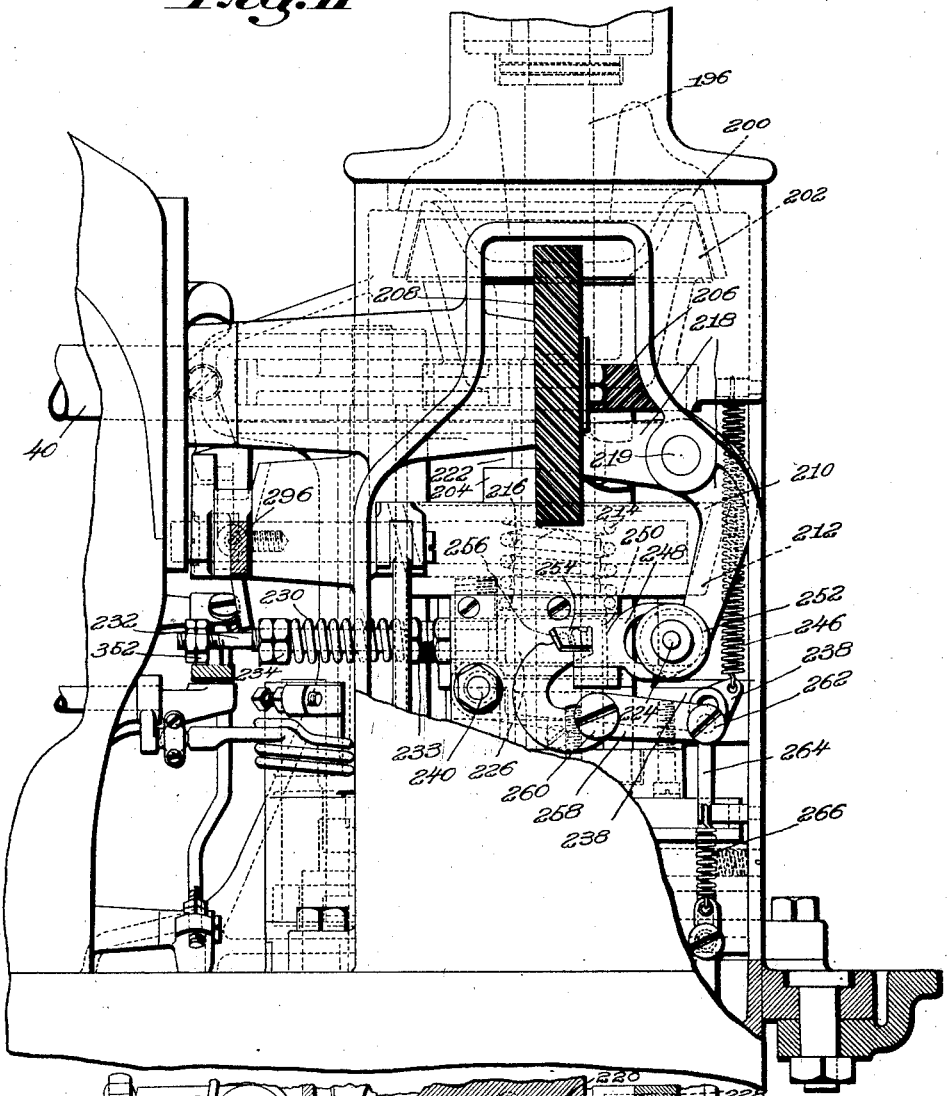

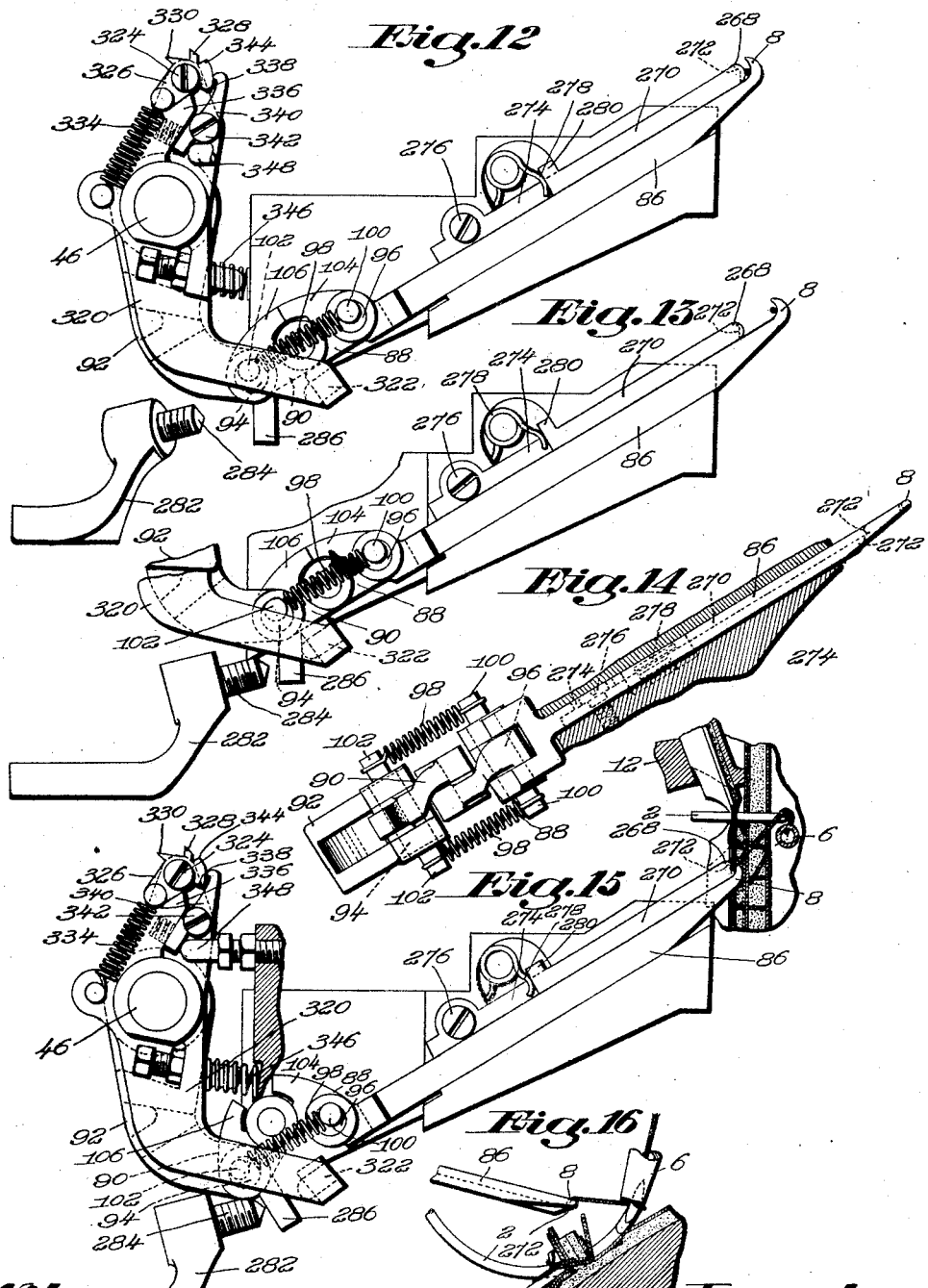

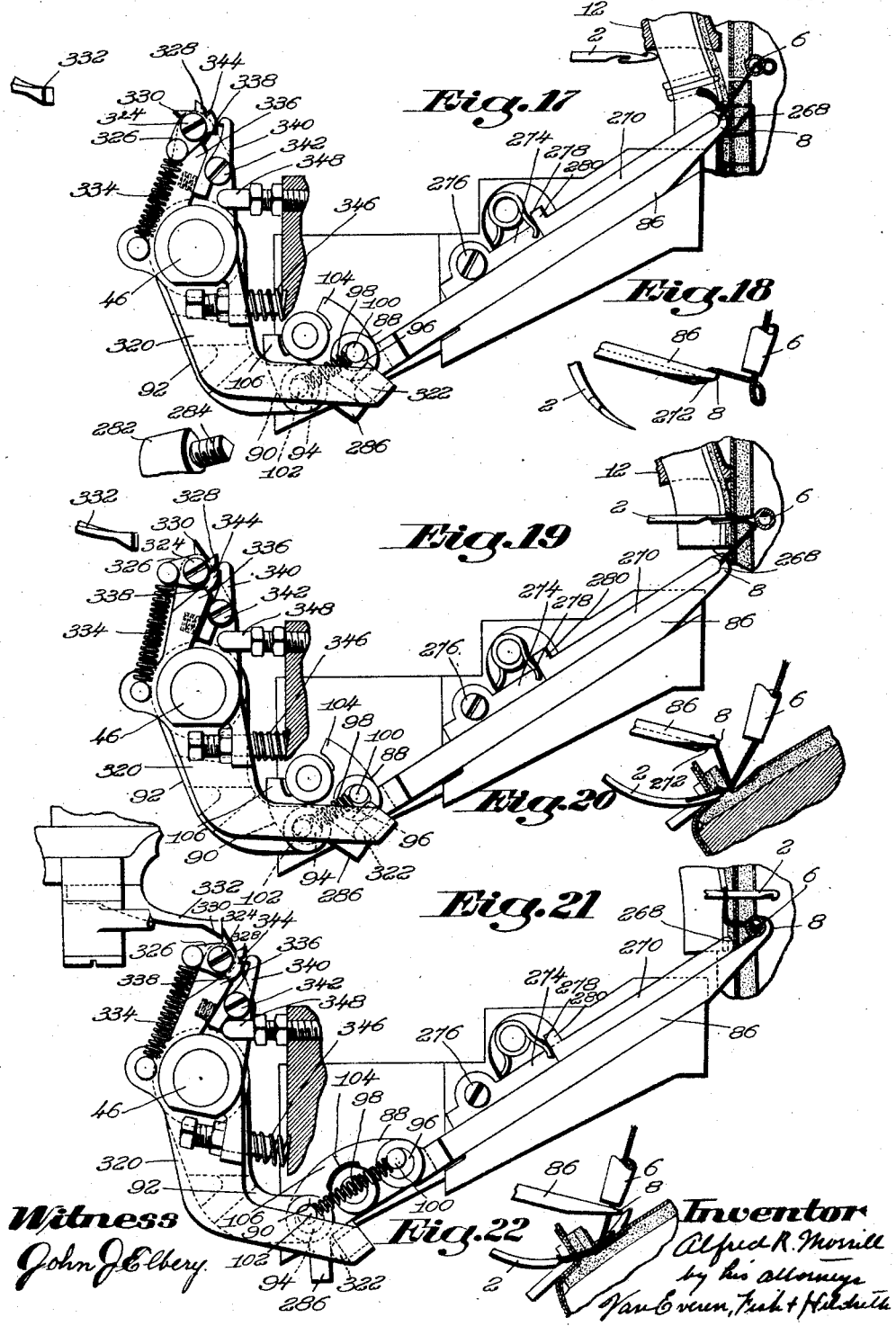

July 12, 1927.
A. R. MORRILL
SEWING MACHINE
Filed Oct. 11, 1919
1,635,856
12 Sheets-Sheet 12
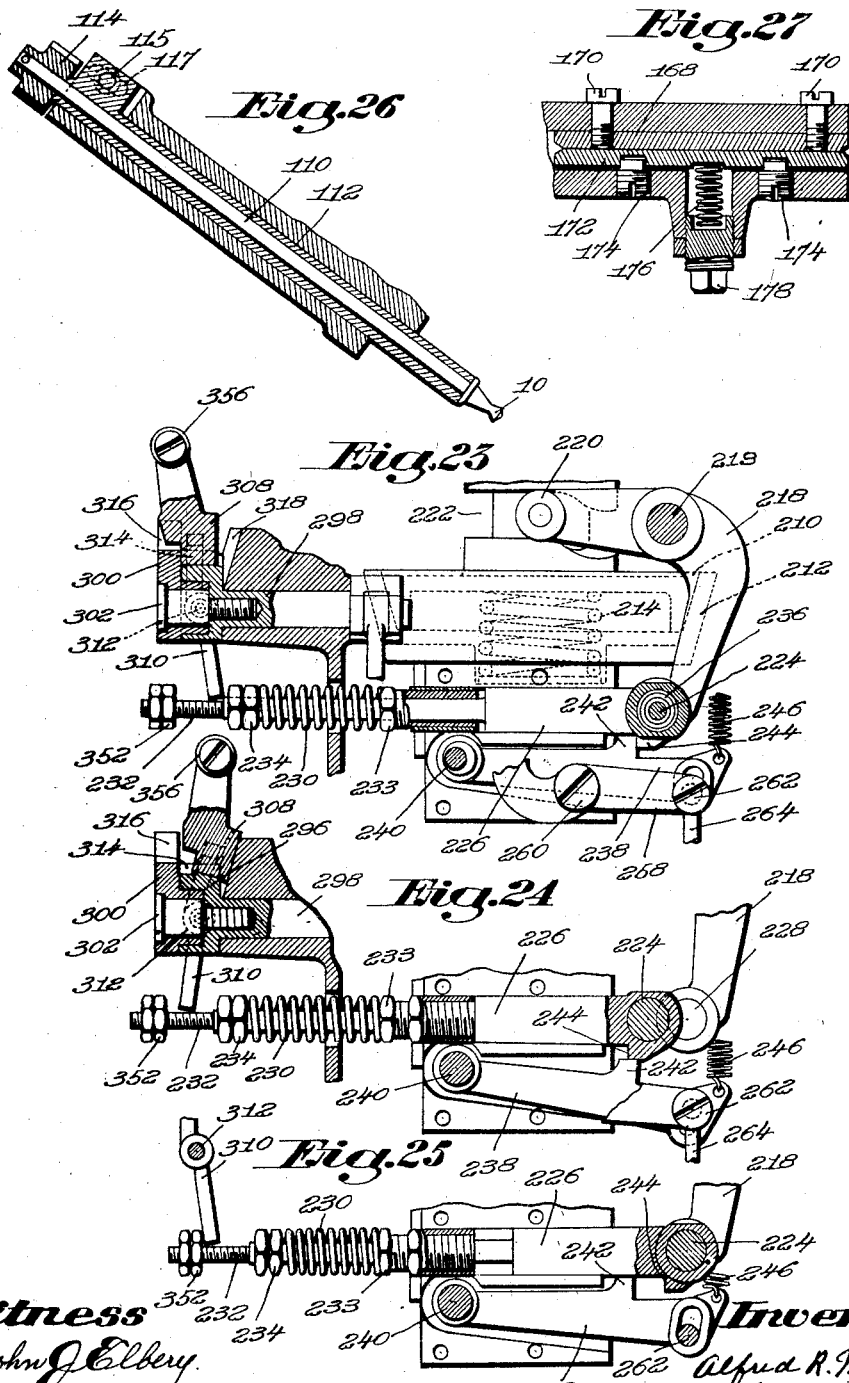

Patented July 12, 1927.

1,635,856

UNITED STATES PATENT OFFICE.

ALFRED R. MORRILL, OF BEVERLY, MASSACHUSETTS, ASSIGNOR TO UNITED SHOE MACHINERY CORPORATION, OF PATERSON, NEW JERSEY, A CORPORATION OF NEW JERSEY.

SEWING MACHINE.

Application filed October 11, 1919. Serial No. 329,952.

This invention relates to machines for sewing inseams of shoes.

The objects of the present invention are to improve the construction and mode of operation of various parts of inseam shoe sewing machines and to produce a high speed machine of this type which is relatively simple and compact in construction and arrangement of parts which will operate in a novel and improved manner in the handling of the thread and in the feeding of the work, and in which upon stopping the machine the shoe may be readily removed from the machine.

With these objects in view, the invention involves various novel and improved features hereinafter described and particularly pointed out in the claims, the advantages of which will be readily understood and appreciated by those skilled in the art.

The features of the invention will be clearly understood from the accompanying drawings illustrating the invention in its preferred form and the following detailed description of the construction therein shown.

Figure 1:
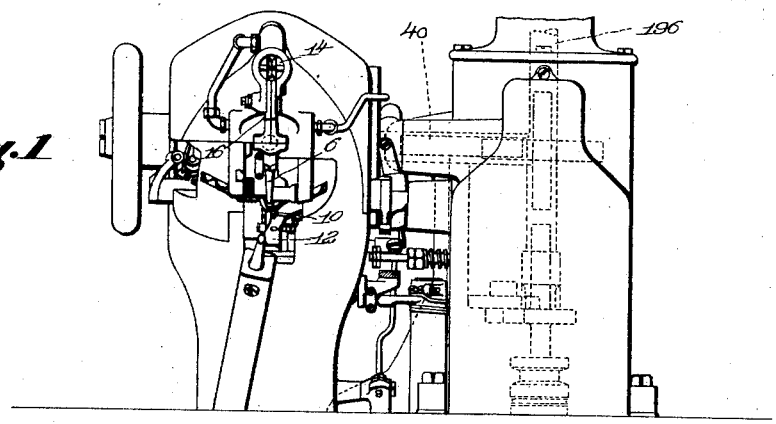
Figure 2:
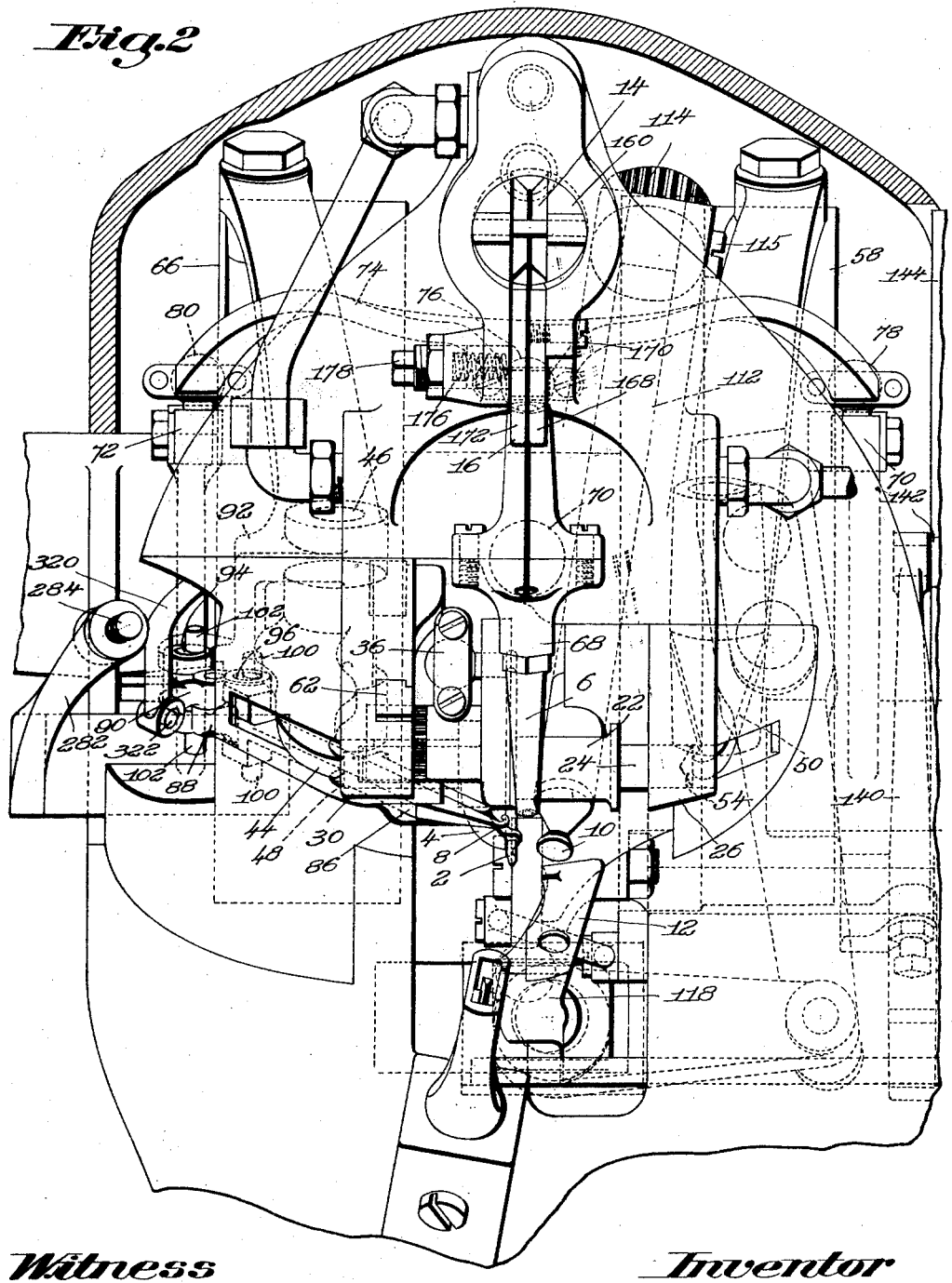
Figure 3:
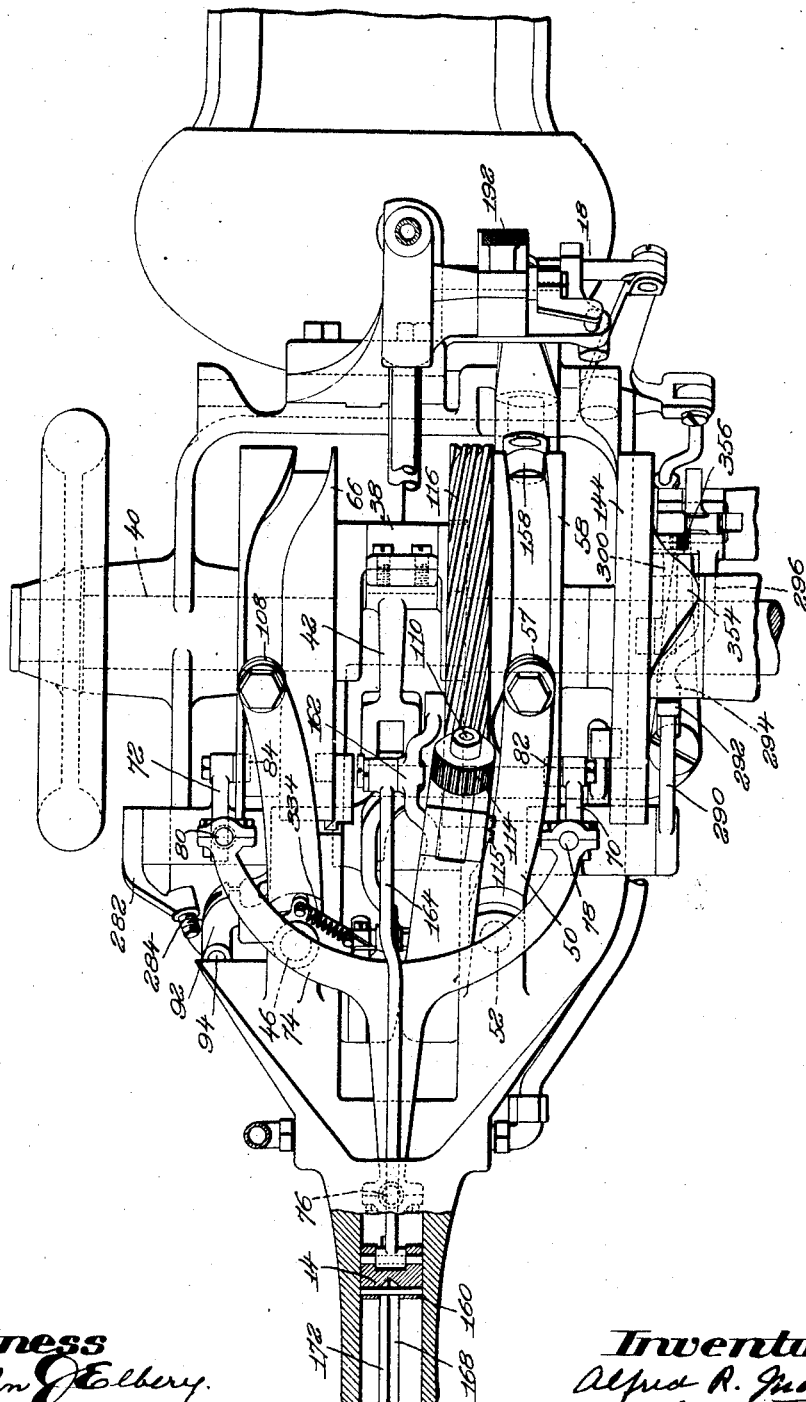
Figure 4:
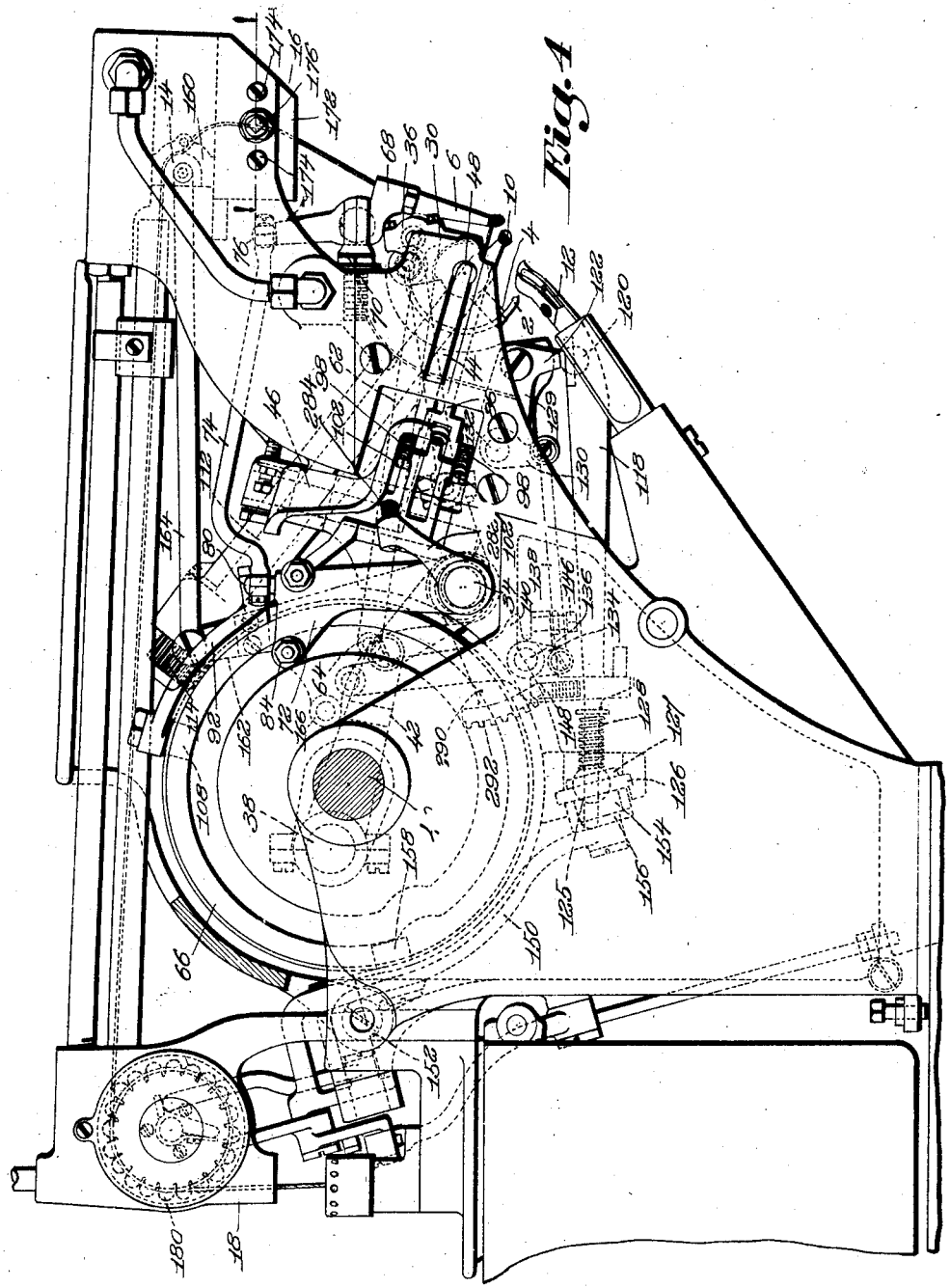
Figure 5:
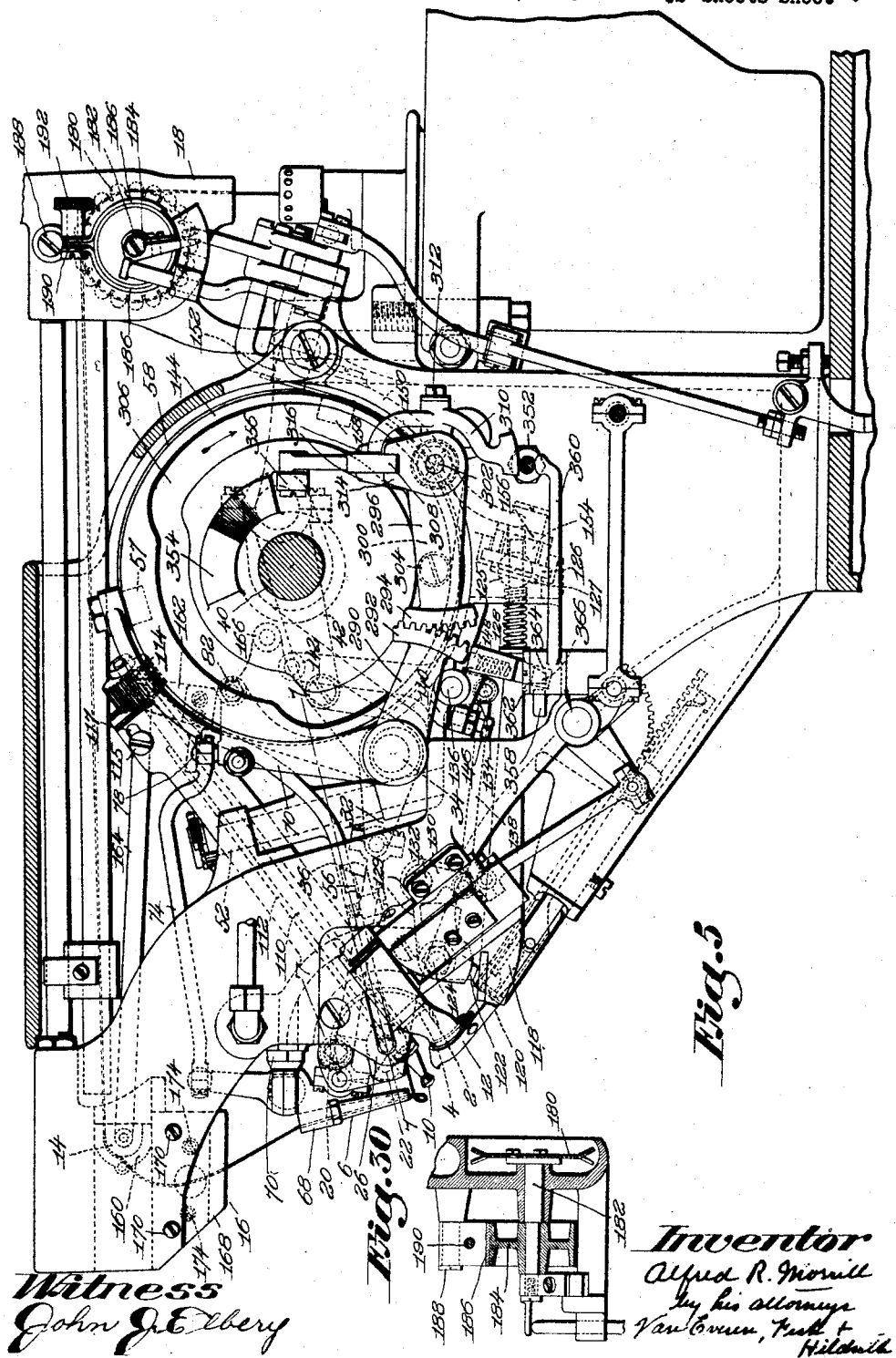
Figure 6:
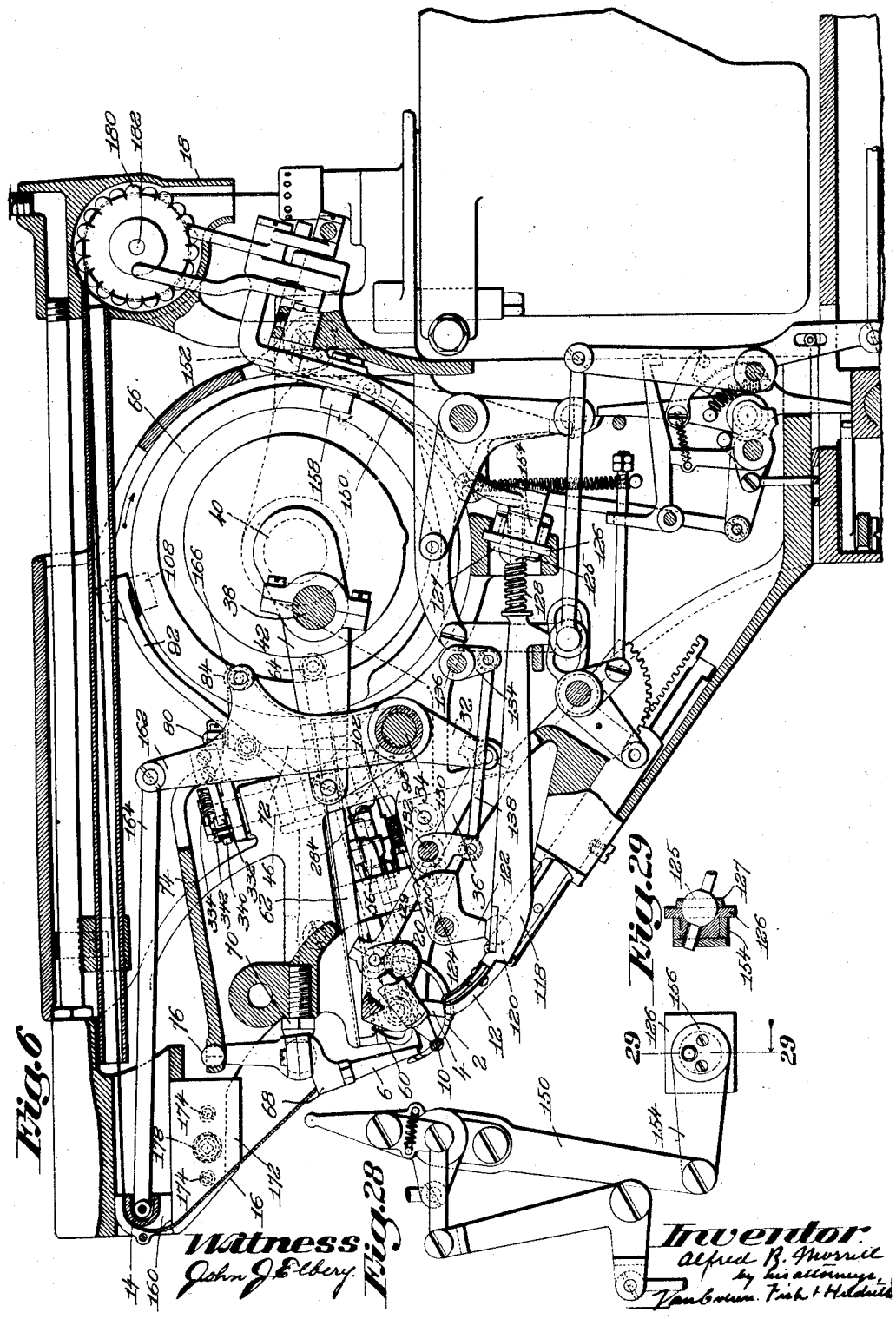
Figure 7:
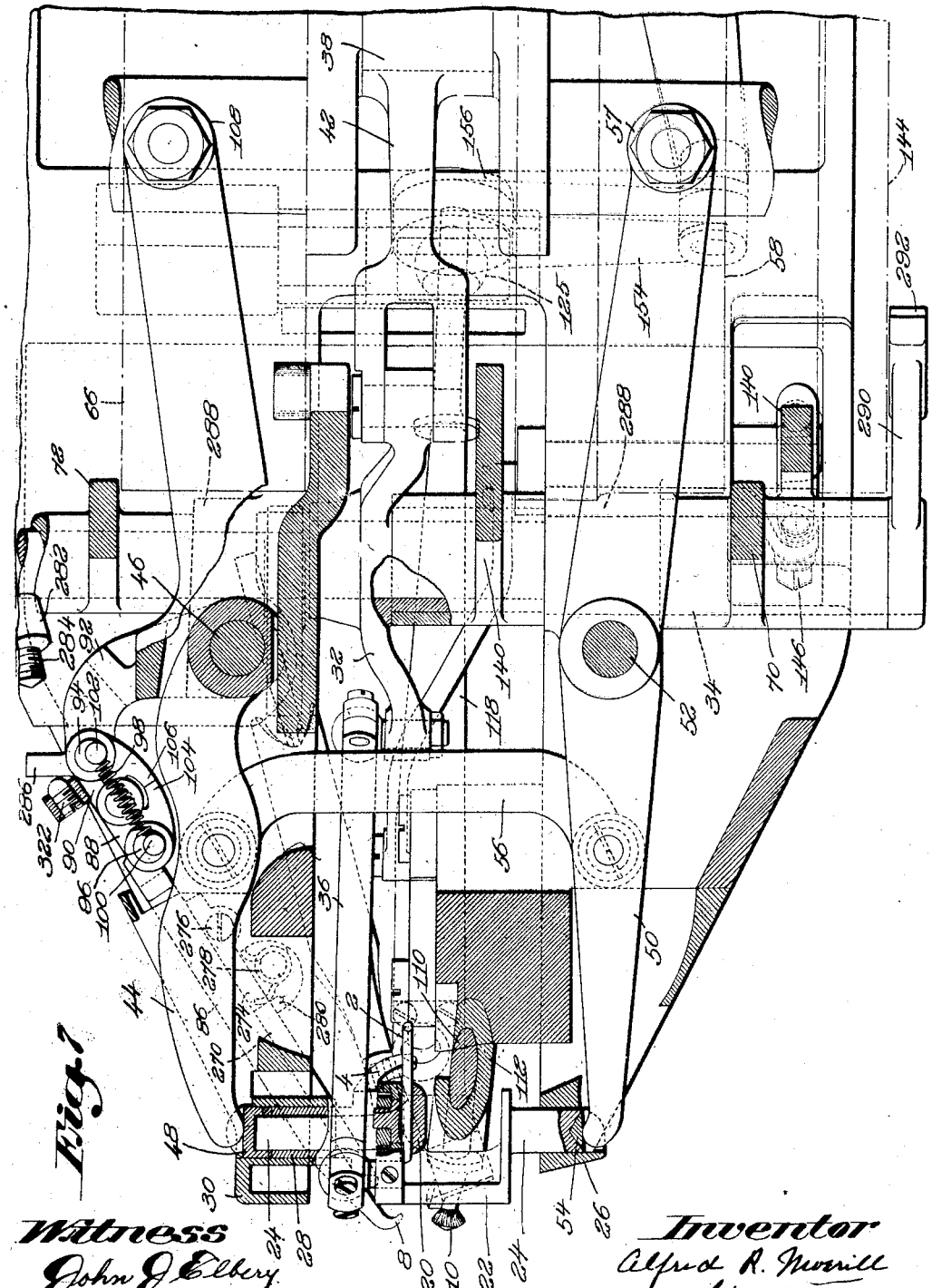
Figures 8, 9:
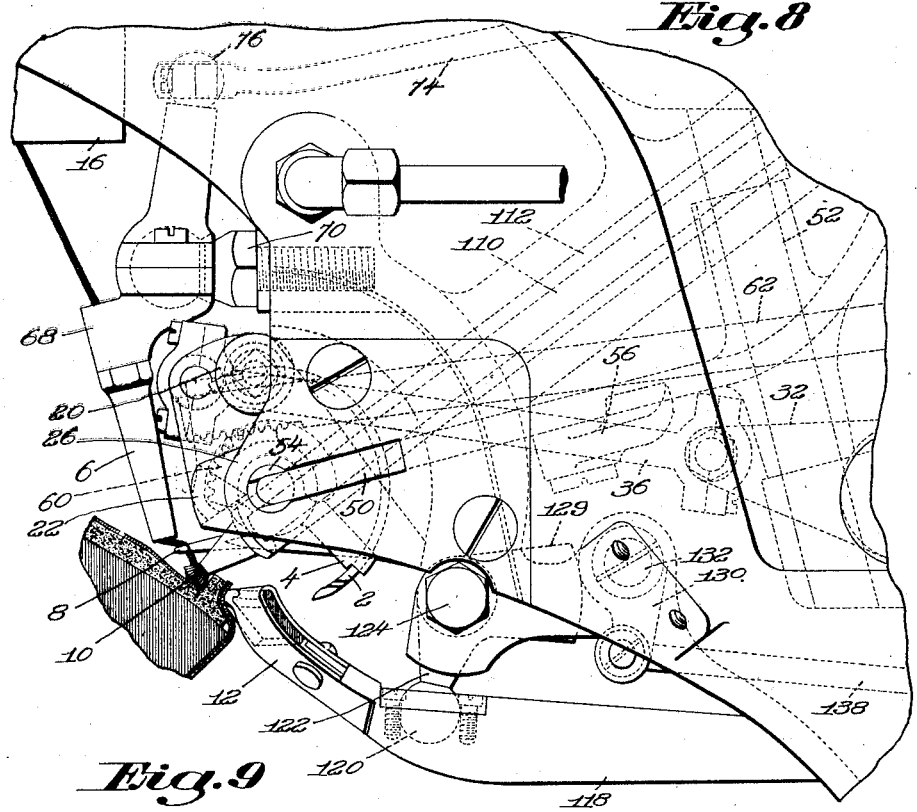

In the drawings Figure 1 is a view in front elevation of a machine embodying the invention; Fig. 2 is a view in front elevation of a portion of the sewing head of the machine; Fig. 3 is a plan view of the sewing head; Fig. 4 is a view in side elevation of the sewing head looking from the left; Fig. 5 is a view in side elevation of the sewing head looking from the right; Fig. 6 is a view in vertical section of the sewing head; Fig. 7 is a view of the sewing head partly in plan and partly in section taken substantially on the line 7—7 of Fig. 5; Fig. 8 is a view in side elevation illustrating a portion of the mechanism shown in Fig. 5; Fig. 9 is a view in vertical section illustrating the needle, needle guide and thread gripping and severing mechanisms; Fig. 10 is a view in vertical section illustrating the driving connections for the main cam shaft of the sewing head and certain associated parts; Fig. 11 is a view in front elevation partly in section of the mechanism illustrated in Fig. 10 and certain associated parts; Fig. 12 is a plan view of the thread gripping and severing mechanism illustrating the parts in the positions which they assume during the normal operation of the machine; Fig. 13 is a view similar to Fig. 12 illustrating the parts in the positions which they assume upon stopping the machine just before the thread is gripped and severed; Fig. 14 is a view in elevation of the thread gripping and severing mechanism as shown in Fig. 13; Fig. 15 is a plan view of the thread gripping and severing mechanism, needle and looper illustrating the positions of the parts as the thread is gripped and severed; Fig. 16 is a view in side elevation of the needle, looper and thread gripping and severing devices illustrating these parts in the same positions as shown in Fig. 15; Fig. 17 is a view similar to Fig. 15 illustrating the positions of the parts when the machine is finally stopped; Fig. 18 is a view in side elevation of the needle, looper and thread gripping and severing devices illustrating these parts in the same positions as shown in Fig. 17; Fig. 19 is a plan view of the thread gripping and severing devices, needle and looper illustrating the parts in the positions which they assume after the first thread drawing stroke of the take-up upon starting the machine; Fig. 20 is a view in side elevation illustrating the needle, looper and thread gripping and severing devices in the same positions as shown in Fig. 19; Fig. 21 is a view similar to Fig. 19 illustrating the parts in the positions which they assume after the second thread drawing stroke of the take-up; Fig. 22 is a view in side elevation illustrating the needle, looper and thread gripping and severing devices in the same positions as shown in Fig. 21; Figs. 23, 24 and 25 are similar views in front elevation partly in section illustrating a portion of the mechanism shown in Figs. 10 and 11 with certain of the parts in different positions in the respective figures; Fig. 26 is a detail view in vertical section illustrating the construction for adjustably supporting the channel guide roll; Fig. 27 is a detail sectional view of the retaining device for controlling the slack in the thread; Fig. 28 is a view in rear elevation illustrating particularly the welt guide mechanism; Fig. 29 is a detail sectional view taken substantially on the line 29—29 of Fig. 28; Fig. 30 is a detail sectional view illustrating the tension mechanism; and Fig. 31 is a detail view in horizontal section illustrating certain parts of the mechanism shown in Figs. 10 and 11.

The various mechanisms of the present machine have the same construction, arrangement and mode of operation as the corresponding mechanisms of the machine illustrated in the pending application of Laurence E. Topham and Alfred R. Morrill, Ser. No. 312,366, filed July 21, 1919. As shown in said Topham & Morrill application, the sewing mechanism of the present machine is embodied in a machine in which the shoe is supported in the machine and all of its movements during the sewing operation are produced and controlled by automatically acting mechanisms. The present invention, however, is not limited to automatic shoe machines and the various features thereof may be embodied in machines in which the shoe is held and manipulated by the operator.

The machine illustrated in the drawing is especially constructed for sewing the inseams of welted shoes and comprises an oscillating curved hook needle 2, a needle guide 4, a looper 6, a thread finger 8, a channel guide roll 10, a welt guide 12, a take-up 14, a thread retaining device 16, and a tension device 18. The thread handling devices of the present machine have the same general mode of operation in the handling of the thread to form a chain stitch seam as is usual in machines of this type. The work engaging parts of the machine are constructed and operated to feed the shoe continuously through the machine, these parts having substantially the same work feeding movements as the corresponding parts of the machine illustrated in Patent No. 1,397,013 issued November 15, 1921 on application, Ser. No. 267,378, filed December 18, 1918. The channel guide roll is mounted in fixed position and is continuously rotated to feed the shoe, and the welt guide and needle are both reciprocated in the direction of feed and cooperate with the channel guide to feed the shoe continuously.

The needle is secured by means of a clamping device 20 (Fig. 7) to a needle carrier 22 formed with laterally extending bearing studs or trunnions 24, one of which is journaled in a bearing in a forwardly projecting arm 26 on the frame and the other of which is journaled in a sleeve 28 mounted to turn in a bearing in a forwardly projecting arm 30 on the frame. The mechanism for oscillating the needle comprising a bell crank lever 32 pivoted upon a shaft 34 extending across the machine, a link 36 connected at its respective ends by universal joints with the needle carrier and with the lower arm of the bell crank lever, a crank 38 carried by the main shaft 40 of the machine, and a pitman 42 connecting the upper arm of the bell crank lever with the crank.

The needle carrier is reciprocated axially to impart lateral feeding and return movement to the needle by means of a lever 44 (see Fig. 7) pivoted on a stud 46 the forward end of which engages in a slot in a button 48 engaging the outer end of the sleeve 28, and a cam lever 50 pivoted on a stud 52 the forward end of which engages in a slot in a button 54 engaging the outer end of the right hand trunnion of the needle carrier. The levers 44 and 50 are connected by a link 56 so that the levers are actuated in unison to reciprocate the needle carrier, and the cam lever 50 carries a cam roll 57 at its rear end engaging in a cam groove in a cam disk 58 mounted on the main shaft 40 of the machine.

The needle guide 4 projects outwardly from a flange formed at the inner end of the sleeve 28 and is oscillated in the usual manner in timed relation to the movements of the needle. The mechanism for oscillating the needle guide comprises a gear segment 60 secured to the flange on the sleeve 28, the teeth of which mesh with rack teeth formed on the forward end of a longitudinally reciprocating slide 62 mounted in guides in the frame. Reciprocatory movements are imparted to the slide by means of a cam roll 64 mounted on the rear end of the slide and engaging in a cam groove formed in a cam disk 66 mounted on the main shaft 40.

The looper mechanism of the present machine is similar to the looper mechanism illustrated and described in applicant's application, Ser. No. 249,088, filed August 9, 1918. In the construction illustrated the looper 6 consists of a tube secured in the lower arm of a lever 68 mounted on the forward end of a stud 70 secured in the frame of the machine. The thread extends downwardly from the thread retaining device through an opening in the lever 68 and through the looper 6, as shown in Fig. 5. The looper lever 68 is connected with the stud 70 by means of a ball and socket joint so that the lever is capable of universal swinging movement about its connection with the stud, and the lever is actuated to carry the looper about the needle by swinging the upper arm of the lever 68 forwardly, rearwardly and laterally. The mechanism for thus actuating the looper lever comprises two cam levers 69 and 72, both pivoted on the shaft 34, and a three armed lever or link 74, the forwardly extending arm of which is connected by a ball and socket joint 76 with the upper arm of the looper lever 68, and the rearwardly extending arms of which are respectively connected by ball and socket joints 78 and 80 with the cam levers 69 and 72. The movements of the cam levers 69 and 72 are such that the link 74 is moved forwardly and rearwardly and is swung about its connections with the respective levers, the forward and rearward movements of the link occurring in timed relation to the swinging movements thereof so as to actuate the looper lever 68 to carry the looper in a circular path about the needle. The lever 69 carries a cam roll 82 engaging in a cam groove in the cam disk 58, and the lever 72 carries a cam roll 84 engaging in a cam groove in the cam disk 66.

The thread finger 8 is operated to measure off thread in the usual manner during each cycle of operations of the machine. The thread finger is secured to the forward end of a slide 86 mounted to reciprocate longitudinally in guides in the frame of the machine. The rear end of the slide 86 is connected by means of pivotally connected links 88 and 90 with a cam lever 92 pivoted on the stud 46. The links 88 and 90 form a toggle, which is normally maintained in a straightened condition as shown in Figs. 12, 13 and 14, so that reciprocating movements are imparted to the slide 86 from the cam lever 92 through the toggle. The links 88 and 90 are respectively secured to studs 94 and 96 which serve to connect said links respectively with the slide 86 and with the cam lever 92, and the toggle formed by the links is normally maintained in a straightened condition by means of tension springs 98 connected at their opposite ends with pins 100 and 102 projecting eccentrically from the ends of the respective studs 96 and 94. The relative movement of the links under the action of the springs 98 is limited by the engagement of stops 104 and 106 formed on the respective links. The cam lever 92 is provided with an arm extending rearwardly over the cam disk 66 which carries a cam roll 108, engaging in a cam groove in said cam disk.

The channel guide roll 10 is secured to the lower end of a shaft 110 mounted to turn in a bearing in a bushing 112 secured in the frame of the machine. To the upper end of the shaft 110 is pinned a spiral gear 114 the teeth of which mesh with spiral gear teeth 116 formed on the periphery of the cam disk 58. Through the connections described the channel guide roll is rotated in definite timed relation to the movements of the needle and welt guide in the direction of feed so as to cooperate with these parts to feed the shoe continuously through the machine. To enable the channel guide roll to be adjusted radially of the needle, the bushing 112 is mounted for longitudinal adjustment in the frame of the machine, and is arranged to be held in adjusted position by means of a screw 115 (see Fig. 26) passing through a slot 117 in the frame and threaded into a projection on the bushing.

The welt guide 12 is mounted for forward and rearward movement, is yieldingly pressed forward against the work during a portion of each cycle of operations so that it will accommodate itself to different thicknesses of work between the welt guide and the channel guide roll, and is then locked in position. The welt guide is also mounted for movement in the direction of feed to enable the same to cooperate with the channel guide roll and needle in feeding the work. The welt guide is yieldingly pressed forward into engagement with the work during the back feeding movement of the guide, and after the completion of its back feeding movement is locked in position during the remainder of each cycle of operations. The welt guide is secured to the forward end of a carrier 118 supported by a ball and socket joint 120 on a swinging support 122 pivoted at 124 on the frame of the machine. The rear end of the carrier 118 is slidingly engaged in a diametrical bore in a ball 125 mounted in a socket formed in a laterally movable slide 126 and in a plate 127 secured to the slide. This manner of mounting the welt guide enables the guide to move forwardly and rearwardly, and the parts are so constructed and arranged that the guide during its forward and rearward movements moves in a path substantially concentric with the needle. The inner edge of the welt is thus maintained in substantially the same position with relation to the path of the needle regardless of the thickness of the work. The welt guide is yieldingly pressed forward into engagement with the work by means of a coiled spring 128 mounted on the rear end of the carrier 118 and interposed between a flange on the carrier and the ball 125. The mechanism for locking the welt guide in position comprises a segment 129 formed on the swinging support 122 and a locking lever 130 pivoted at 132 on the frame of the machine, and formed with an eccentric face arranged to engage the rear face of the segment to lock the support 122 in position. The mechanism for actuating the locking lever 130 to lock and unlock the welt guide comprises a lever 134 pivoted on a stud 136, and a link 138 connecting one arm of said lever with the locking lever. A cam lever 140 is also pivoted on the stud 136 and carries a cam roll 142 engaging in a cam groove in a cam disk 144 mounted on the main shaft 40. The lever 134 is actuated from the cam lever 140 by means of an abutment screw 146 mounted in an arm on the lever 134 and engaging a lateral projection on the forward side of the cam lever and a spring pressed plunger 148 mounted in another arm on the lever 134 and arranged to engage a projection on the rear side of the cam lever. The lever 134 is normally held by the action of the plunger 148 in the angular position shown in Fig. 5 with relation to the cam lever with the abutment screw 146 in engagement with the projection on the forward side of the cam lever. With the above construction the lever 134 is swung forwardly and rearwardly by the cam lever, and the locking lever 130 is swung forwardly and rearwardly with the lever 134 to lock and unlock the welt guide. The cam lever is arranged to have a certain amount of overthrow or excess movement in a direction to lock the welt guide, the plunger 148 yielding during the locking movement of the cam lever after the locking face on the locking lever has engaged the segment 129. The provision of the yielding connection between the cam lever 140 and the lever 134 eliminates the necessity of frequent adjustment of the parts to take up wear, and insures the locking of the welt guide in a reliable manner even when the parts become considerably worn by long continued use.

The welt guide is moved in the direction of feed to assist in feeding the work by swinging the carrier 118 in a horizontal plane about its connection with the swinging support 122. The carrier 118 is swung horizontally about its connection with the support 122 by the reciprocating movements imparted to the slide 126 by means of a cam lever 150 pivoted on a stud 152 through a link 154 connecting the cam lever with the slide. Oscillating movements are imparted to the cam lever 150 to reciprocate the slide 126 through the engagement of a cam roll 158 mounted on the lever with a cam groove formed in the cam disk 58.

The welt guide and the center about which the welt guide is swung horizontally are arranged so that during the advancing movement of the welt guide in the direction of feed the guide swings in an arc approaching the channel guide roll. The welt guide thus during its advancing movement gives the work a positive predetermined squeeze or compression which is maintained during the retracting movement of the needle. The welt guide thus forces the upper snugly against the shoulder of the insole and the shoe firmly against the channel guide roll.

The take-up 14 operates in the usual manner during each cycle of operations to draw the thread taut about the shank of the needle when the needle is in the work, and to pull thread from the supply for the formation of the succeeding stitch. The take-up is carried by a reciprocatory slide block 160 mounted in guides in the frame of the machine and reciprocated by means of a cam lever 162 pivoted on the shaft 34 through a link 164 connecting the slide block with the upper end of the cam lever. The cam lever 162 carries a cam roll 166 engaging in a cam groove in the cam disk 58.

The thread retaining device 16 is arranged to engage frictionally the thread between the take-up and the looper, and operates to maintain the thread taut between the retaining device and the work during the retracting or inactive stroke of the take-up, allowing the thread to pay out under the pull exerted thereon by the looper, thread finger and needle as required by these thread handling devices, thereby insuring the proper looping of the needle and formation of each stitch. The thread retaining device comprises a thread engaging plate 168 secured by screws 170 to the frame of the machine, and a cooperating thread-engaging plate 172 arranged parallel thereto and mounted on the inner ends of guide screws 174 (see Fig. 27) secured in the frame so that it is movable toward and from the plate 168. The plate 172 is yieldingly pressed toward the plate 168 by means of a coiled spring 176 interposed between the plate 172 and the inner end of an adjusting screw 178 threaded into the frame. The thread extends from the take-up downwardly between the plates 168 and 172 and thence through the opening in the looper lever 68, through the looper, and back of the thread finger to the work. With the above construction, after the completion of the loop-drawing stroke of the take-up, the thread is slackened between the take-up and the retaining device by the retracting movement of the take-up, and is then drawn downwardly between the retaining plates 168 and 172 by the pull exerted by the thread handling devices on the thread. The retaining plates 168 and 172 at this time maintain a yielding pressure on the thread tending to retard its movement, and thus keep the thread taut between the retaining device and the work. The retaining device thus takes the place of an auxiliary take-up, insuring the proper looping of the needle and furnishing the resistance against which the needle pulls at the end of its retracting stroke to tighten the preceding loop. The pressure with which the retaining plates 168 and 172 engage the thread may be adjusted to regulate the action of said device by turning the adjusting screw 178.

The tension device comprises a tension wheel 180 about which the thread passes on its way from the supply to the work, and a brake device for retarding the rotation of the tension wheel to apply tension to the thread. The tension wheel is secured to one end of a shaft 182 journaled in a bearing in the frame of the machine, to the other end of which is secured a brake wheel 184. A pair of brake shoes 186 are arranged to engage the periphery of the brake wheel.

The brake shoes 186 are formed on the arms of a spring plate bent in a loop and held in place on the frame of the machine by means of a screw 188 passing through the eye of the loop. To enable the pressure exerted by the brake shoes on the brake wheel to be adjusted, an adjusting screw 190 is passed through the arms of the spring plate intermediate the screw 188 and the brake shoes, and is threaded into a hand nut 192. By the frictional engagement of the brake shoes 186 with the brake wheel 184 the rotation of the tension wheel is retarded so as to maintain a constant tension on the thread.

The driving mechanism for the machine (see Figs. 10 and 11) comprises a vertical driving shaft 196 adapted to be connected at its upper end through suitable gearing with a power shaft. The driving shaft 196 carries the driving member 200 of a friction clutch the driven member of which, indicated at 202, is carried by a flange formed on a sleeve 204 loosely mounted on the shaft. The sleeve also carries a spiral gear 206 formed on the flange on said sleeve which meshes with a spiral gear 208 fixed to the main shaft 40. During the sewing operation the members 200 and 202 of the main friction driving clutch are engaged, and the main shaft 40 is driven through the spiral gears 206 and 208 at a speed dependent upon the speed of the driving shaft 196.

The machine is provided with mechanism which when thrown into operation will act automatically to disengage the members of the main driving clutch and to engage a brake to stop the machine with the main shaft in a predetermined angular position. The sleeve which carries the driven member of the main driving clutch also carries a brake member 210 arranged to engage a brake shoe 212 formed on the frame of the machine. The sleeve 204 is arranged to slide longitudinally of the driving shaft 196 to carry the driven clutch member 202 into and out of engagement with the driving clutch member 200, and to carry the brake member 210 into and out of engagement with the brake shoe 212. The sleeve is acted upon by a coiled spring 214 interposed between the lower end of the sleeve and a flange on a bushing 216 surrounding the driving shaft 196 and resting on a shoulder on the frame which normally maintains the sleeve in its upper position with the driven clutch member in engagement with the driving clutch member and with the brake member 210 disengaged from the brake shoe 212.

The mechanism for moving the sleeve 204 longitudinally to disengage the clutch and engage the brake comprises an oscillatory bell crank lever 218 pivoted on a stud 219 and carrying a cam roll 220 at the end of the laterally extending arm thereof which engages in a cam groove 222 in the sleeve 204. Said mechanism also comprises a locking pin 224 mounted to slide longitudinally in a carrier 226 and arranged to engage in a recess 228 in the downwardly extending arm of the bell crank lever 218. The carrier 226 (see Figs. 23, 24 and 25) is mounted to slide longitudinally in suitable guides in the frame of the machine and is acted upon by a coiled spring 230 surrounding a rod 232 forming part of the carrier 226 and interposed between the outer end of an adjustable screw threaded sleeve 233 through which the rod slides and a nut 234 threaded on the outer end of the rod. The spring 230 normally holds the carrier 226 in position with a shoulder on the carrier in engagement with the inner end of the sleeve 233. The locking pin 224 is acted upon by a coiled spring 236 which tends to move the same rearwardly into engagement with the bell crank lever 218. During the normal operation of the machine, however, the locking pin is held in forward position out of engagement with the arm of the bell crank lever so that the lever is oscillated idly by the action of the cam groove 222. In stopping the machine the locking pin is released and is forced rearwardly by the action of the spring 236 against the forward side of the downwardly extending arm of the bell crank lever 218, and when the recess in the lever registers with the locking pin the locking pin is engaged in the recess thus locking the lever to the carrier 226. Obviously the lever 218 is actuated by the cam groove 222 to bring the recess 228 into registration with the locking pin 224 and the carrier 226 is locked to the lever at a definite predetermined point in the rotation of the main shaft 40. This occurs preferably when the roll 220 is in the upper idle portion of the cam groove. After the carrier 226 is locked to the bell crank lever 218 by the locking pin 224, as the cam roll 220 reaches a downward throw in the cam groove 222, the bell crank lever 218 is swung in a direction to move the carrier 226 longitudinally to the right against the tension of the spring 230. The cam roll 220 then passes into the lower idle portion of the cam groove 222, and when the main shaft 40 of the machine arrives in stopping position the cam roll engages in an upward throw in the cam groove. During the passage of the cam roll through this upward throw in the cam groove the sleeve 204 is moved downwardly by the cooperative action of the cam groove and the cam roll to disengage the driven clutch member 202 from the driving clutch member 200 and to engage the brake member 210 with the brake shoe 212. In order to render this upward throw in the cam groove effective to move the sleeve 204 downwardly, a latch lever 238 is provided to prevent the return of the carrier 226 to its normal limiting position after it is moved longitudinally to the right by the action of the lever 218. The latch lever 238 is pivoted on a stud 240 and is formed with a projection 242 for engagement with a projection 244 on the carrier 226. The latch lever 238 is normally held in lowered position with the projection 242 on the lever beneath the projection 244 on the carrier, as shown in Fig. 24, and is acted upon by a coiled spring 246 which tends to swing the same upwardly into acting position. As the carrier 226 is moved to the right during the passing of the cam roll 220 through the downward throw in the cam groove 222, the lever 238 is swung upwardly by the action of the coiled spring 246 into the position shown in Fig. 25 with the projection 242 at the left of the projection 244. As the carrier 226 moves back to the left during the passage of the cam roll 220 through the upward throw in the cam groove 222, the projection 242 on the latch lever engages the projection 244 on the carrier thereby arresting the return movement of the carrier before the carrier reaches its normal limiting position, as shown in Fig. 23. The stopping of the return movement of the carrier by the latch lever renders the cam throw effective to move the sleeve 204 and the sleeve is moved downwardly to disengage the clutch and engage the brake by the cooperative action of the cam groove and the cam roll.

The mechanism for holding the locking pin in forward position out of engagement with the lower arm of the bell crank lever 218 comprises a lever 248 pivoted on a stud 250, one arm of which is provided with spaced projections embracing the portion of the carrier 226 in which the locking pin slides and arranged to engage a collar 252 secured to the forward end of the locking pin. The other arm of the lever 248 carries a gear segment 254 which meshes with a gear segment 256 formed on one arm of a lever 258 pivoted on a stud 260. The other arm of the lever 258 is pivotally connected by means of a pin 262 with the upper end of a vertically movable rod 264. The rod 264 also controls the position of the latch lever 238 through the engagement of the rear end of the pin 262 in a slot in the latch lever. In starting the machine the rod 264 is depressed by the operator and in stopping the machine said rod is released and is then moved upwardly by the action of a coiled spring 266. When the rod 264 is depressed the lever 248 is actuated from the lever 258 to move the locking pin 224 forwardly out of locking engagement with the bell crank lever 218, allowing the sleeve 204 to be moved upwardly by the action of the coiled spring 214 to engage the clutch and disengage the brake, and the latch lever 238 is moved downwardly out of acting position allowing the carrier 226 to be moved to the left into its normal position by the action of the coiled spring 230. As long as the rod 264 is held in depressed position, therefore, the clutch members 200 and 202 are held in engagement and the main shaft 40 is continuously driven at a speed depending upon the speed of the driving shaft 196. When the rod 264 is released and is moved upwardly under the action of the coiled spring 266 the locking pin 224 is free to move rearwardly under the action of the coiled spring 236 and is actuated to lock the carrier 226 to the lever 218. The upward movement of the rod 264 also releases the latch lever 238 allowing said lever to move upwardly into acting position under the action of the coiled spring 246 as the carrier 226 is moved to the right. Thus upon the release of the rod 264 the main driving clutch is disengaged and the rotary movement of the driving shaft 196 and that of the shaft 40 is stopped with the latter shaft in a predetermined angular position.

When the invention is embodied in a machine in which the shoe is held and manipulated by the operator during the sewing operation the rod 264 may conveniently be held in depressed position by the operator during the normal operation of the machine through connections between the rod and a treadle or similar member, and may be released by the release of the treadle. When the invention is embodied in a machine in which the shoe is supported and moved automatically to correct the position thereof with relation to the sewing mechanism, during the operation such as the machine illustrated and described in the Topham & Morrill application referred to above the rod 264 may be held in depressed position throughout the sewing operation by means of a latch (not shown) and this latch may be moved out of holding position automatically to release the rod at the completion of the sewing operation.

The machine is provided with mechanism for severing the thread between the looper and the shoe upon the completion of the seam and for gripping and holding the end of the thread leading to the supply after it is severed. The thread severing and gripping mechanism is arranged to operate before the looper encircles the needle in the last cycle of movement of the machine. After the thread is severed and gripped, the looper encircles the needle and the needle retracts from the work before the machine is brought to rest. In order that the needle may be free of thread during its last retracting movement mechanism is provided for causing the needle to misloop during the last cycle of movement of the parts. In the present construction this mechanism is constructed and arranged to reduce the advancing movement of the needle during the last cycle so that the looper as it encircles the needle lays the thread about the needle between the needle barb and the point and the needle readily frees itself from the thread as it retracts from the work. The mechanism for severing and gripping the thread and the mechanism for reducing the advancing movement of the needle during the last cycle are all controlled from the locking pin carrier 226. The thread severing and gripping mechanism (see Figs. 12 to 22 inclusive) comprises the thread finger 8 which forms a thread gripping jaw, a cooperating thread gripping jaw 268 formed at the forward end of a longitudinally movable slide 270 and a thread cutting knife 272 formed at the forward end of a bar 274 located below the slide 270 and secured by a screw 276 to the frame. The slide 270 is acted upon by a spring 278 which tends to advance the slide, and the forward movement of the slide under the influence of the spring is limited by the engagement of a projection 280 on the slide with a suitable abutment face on the frame of the machine. During the normal operation of the machine, the slide 86 is retracted in each cycle of operations substantially from the position shown in Fig. 13 to that shown in Fig. 12 to actuate the thread finger to form a bight or loop in the thread, the thread being out of contact with the gripping jaw 268 when the thread finger is in its limiting retracted position. The thread finger thus acts in the usual manner to measure off thread on the work side of the needle while the needle is in the work and to give up thread to the needle during the retracting stroke of the needle. Upon stopping the machine, however, the slide 86 is retracted substantially into the position shown in Fig. 17, and during this retracting movement of the slide the thread finger carries the thread into engagement with the gripping jaw 268 thereby gripping the thread between the thread finger and said jaw, and the gripping jaws then retract together thereby carrying the thread across the knife 272 and severing the same. This retracting movement is imparted to the slide 86 to actuate the thread finger 8 to grip and sever the thread by the cooperative action of the cam lever 92 and mechanism acting to break the toggle 88—90.

The mechanism for breaking the toggle comprises an arm 282 secured to the left hand end of the shaft 34 (see Fig. 4) and carrying an abutment screw 284 arranged to engage a lug or projection 286 formed on the toggle link 90.

The shaft 34 is mounted to turn in bearings 288 formed on the frame (see Fig. 7), and to the right hand end of said shaft is secured an arm 290 carrying at its rear end a gear segment 292 meshing with a gear segment 294 carried at the forward end of a pivoted arm 296 (see Figs. 5, 10, 11, 23 and 24). The arm 296 is secured to and preferably formed integral with the outer end of a rock shaft 298 mounted to turn in a bearing in the frame. A cam lever 300 is pivoted on a stud 302 threaded into the outer end of the shaft 298 and carries a cam roll 304 engaging in a cam groove 306 in the cam disk 58. The cam lever 300 is normally oscillated idly by the action of the cam groove 306 thereon. Upon stopping the machine, however, the cam lever is connected with the arm 296 so that the arm is then actuated from the cam lever. The mechanism for connecting the cam lever with the arm 296 comprises a block 308 secured to the upper arm of a lever 310 pivoted on a stud 312 mounted on the hub of the arm 296, said block engaging between projections 314 formed on the hub of the arm. The block 308 is also arranged to engage between projections 316 formed on the cam lever 300 to lock the cam lever to the arm 296. The lever 310 is normally held in position with the block 308 disengaged from between the projections 316 on the cam lever 300 and engaged in a recess 318 in the frame to hold the arm 296 from swinging movement, as shown in Fig. 24. Upon stopping the machine the lever 310 is actuated from the movement of the locking pin carrier 226 to swing the block 308 inwardly thereby engaging the block between the projections 316 on the cam lever 300 to lock the arm 296 to the cam lever. The arm 296 is locked to the cam lever when the cam roll 304 is in the outer portion of the cam groove 306, and as the cam roll passes into the inner portion of the groove the arm is swung upwardly by the cam lever thereby turning the shaft 34 in a direction to swing the arm 282 downwardly. The movement of the arm 282 thus produced carries the abutment screw 284 from a position above the projection 286 on the toggle ink 90 into a position back of said projection, as shown in Fig. 13, this movement of the arm 282 occurring prior to the thread finger retracting stroke of the cam lever 92. With the abutment screw 284 in the latter position during the thread finger retracting stroke of the cam lever 92, the projection 286 on the toggle link 90 engages the abutment screw 284 thereby swinging the toggle link 90 about its pivotal connection with the cam lever and breaking the toggle as shown in Fig. 15. As the toggle is broken the retracting movement imparted to the slide 86 actuates the thread finger first to grip the thread against the thread gripping jaw 268, and then to draw the thread across the knife 272 to sever the same.

The advancing stroke of the needle is reduced so as to cause the needle to misloop during the last cycle of movement of the machine by the turning movement imparted to the shaft 34 upon stopping the machine. As clearly shown in Fig. 7 that part of the shaft 34 upon which the bell crank lever 32 is mounted is eccentric to the parts of said shaft engaging in the bearings 288. This eccentric portion of the shaft 34 is arranged so that as said shaft is turned in a counter-clockwise direction (Fig. 5) by the cam lever 300 to throw the thread gripping and severing devices into operation, the bell crank lever 32 is moved forwardly to a relatively slight degree. Because of this adjustment of the bell crank lever, the needle during its last work piercing stroke advances to a limiting position somewhat back of its normal advanced position, as shown in Fig. 16, and the looper, as it encircles the needle, lays the thread about the needle between the barb and the point thereof. As the needle retracts from the work it readily disengages itself from the loop of thread formed about the same by the looper. Figs. 17 and 18 illustrate the condition of the parts of the thread gripping and severing mechanism when the rotation of the main shaft 40 is finally arrested.

Before the machine is stopped the shaft 34 is turned in a clockwise direction to its normal position, thereby restoring the arm 282 and the bell crank 32 to their normal positions. The needle, therefore, executes its normal advancing stroke during the first cycle of operations upon starting the machine. The toggle 88—90, however, is maintained in a broken condition by the action of the springs 98 and the end of the thread leading from the supply is securely held between the thread finger and the gripping jaw 268 during the first part of a seam formation until after the take-up has executed its second active or loop-drawing stroke.

During the last cycle of operations before the machine is stopped the thread finger and gripping jaw move backward from the position indicated in Fig. 17 and return to this position, the movement being equal to the normal thread measuring movement of the thread finger. Slack thread is thus left between the thread finger and looper as indicated in Fig. 18.

The first stroke of the take-up upon starting the machine occurs while the needle is advancing through the work in its first work piercing stroke or before the first stitch is even partially formed, this action of the take-up merely drawing the thread taut between the thread gripping devices and the tension wheel and imparting a slight rotary movement to the tension wheel. The thread finger and gripping jaw then move backward and return to the position indicated in Fig. 19, thus measuring off thread and giving it up to the needle during its retracting stroke. The holding of the thread by the gripping devices during the first cycle of operations insures the proper looping of the needle in the first stitch formation and the tightening of the stitch in a reliable manner. After the completion of the second loop-drawing stroke of the take-up the toggle 88—90 is straightened, the thread finger is advanced to release the thread and the thread finger thereafter resumes its normal operation. The mechanism for thus controlling the action of the thread gripping devices (see Figs. 12 to 22 inclusive) comprises a lever 320 pivoted loosely on the stud 46, and carrying an abutment stud 322 at the end of its forwardly extending arm arranged to engage the projection 286 on the toggle link 90. Pivoted at 324 on the lever 320 is a ratchet lever 326 provided with teeth or projections 328 and 330, arranged to be engaged by an arm 332 formed on the take-up actuating cam lever 162. The ratchet lever 326 is acted upon by a coiled spring 334 which normally holds the same in the position shown in Fig. 12 in engagement with the rear side of a stop 336 on the lever 320. In order to limit the turning movement of the ratchet lever in a clockwise direction, said lever is formed with an abutment or shoulder 338 arranged to engage the upper end of the stop 336. To hold the ratchet lever in position with the abutment 338 in engagement with the stop 336, a spring pressed pawl 340 is pivoted at 342 on the lever 320 and is arranged to engage a shoulder 344 on the ratchet lever. The lever 320 is acted upon by a coiled spring 346 which maintains the same normally in the limiting position shown in Fig. 12 with an arm on the pawl 340 in engagement with an abutment screw 348 threaded into the frame and with said arm also in engagement with the forward face of the stop 336.

Fig. 17 illustrates the condition of the parts just described at the beginning of the sewing of a seam. As the take-up actuating cam lever 162 acts to impart the first loop-drawing stroke to the take-up, the arm 332 on said lever engages the projection 328 on the ratchet lever 326 and the ratchet lever is swung into the limiting position shown in Fig. 19, with the shoulder 338 in engagement with the stop 336, and is held in such position by the pawl 340. As the take-up actuating cam lever acts to impart the second loop-drawing stroke to the take-up, the arm 332 engages the projection 330 on the ratchet lever and the lever 320 is thereby swung in a clockwise direction (Fig. 12) about the stud 46. During this movement of the lever 320 the abutment stud 322 engages the projection 286 on the toggle link 90 thereby straightening the toggle 88—90 and advancing the thread finger to release the end of the thread, as shown in Fig. 21. The thread finger during its forward movement passes by the thread between the looper and the work and lies in front of this portion of the thread in position to resume its normal operation when its forward movement ceases, the thread being deflected laterally by the thread finger as it moves forwardly. During the toggle straightening movement of the lever 320, the abutment screw 348 engages the lower arm of the pawl 340 thereby disengaging the pawl from the shoulder 344 on the ratchet lever so as to allow the ratchet lever to swing back to its normal position under the action of the spring 334 as the arm 332 is disengaged from the projection 330 on the ratchet lever.

The lever 310 is actuated to swing the block 308 into locking position between the projections 316 on the cam lever 300 by the movement of the locking pin carrier 226 to the right upon stopping the machine. To this end the lever is provided with an arm projecting downwardly from its pivotal point into position to be engaged by a nut 352 mounted on the locking pin carrier. As the locking pin carrier is moved to the right in the manner described above upon stopping the machine, the nut 352 engages the lever 310 and swings the lever in a direction to carry the block 308 between the projections 316 on the cam lever 300, said projections being then in position to receive the block between them. The block 308 remains in locking position with relation to the cam lever during the stoppage of the machine and during a portion of the first revolution of the main shaft 40 upon starting the machine. The block is disengaged from between the projections on the cam lever and is engaged in the recess 318 during the first revolution of the main shaft by means of a cam 354 carried by the cam disk 58 and arranged to engage a cam roll 356 mounted on an upwardly projecting arm formed on said block.

The stopping devices are arranged to stop the machine at a point in a cycle of operations when the needle is substantially at the limit of its retracting stroke. At this point in a cycle of operations the welt guide is normally locked in engagement with the shoe. To enable the shoe to be readily removed from the machine, mechanism is provided which will act automatically upon stopping the machine to unlock the welt guide and draw the same back away from the shoe. In the illustrated construction a bell crank lever 358—360 is pivoted on a stud 362 and is arranged with the arm 358 thereof extending laterally of the machine below the welt guide carrier and in front of projections 364 and 366 formed respectively on the arm of the lever 134 carrying the spring pressed plunger 148 and on the welt guide carrier 118. The rearwardly extending arm 360 of the bell crank lever is formed at its end with a projection arranged to be engaged by the nut 352 on the locking pin carrier 226. As the locking pin carrier is moved to the right upon stopping the machine, the bell crank lever 358—360 is actuated by the engagement of the nut 352 with the rearwardly extending arm thereof to swing the laterally extending arm of said lever rearwardly. During this movement of the bell crank lever the laterally extending arm of the lever first engages the projection 364 which is arranged somewhat in advance of the projection 366, and the lever 134 and the locking lever 130 are actuated to unlock the welt guide after which said arm engages the projection 366 and the welt guide carrier is retracted to carry the welt guide away from the shoe.

Although in the illustrated embodiment of the invention the machine is fitted for sewing together the uppers, welts and insoles of welted shoes, it may be fitted for sewing together the soles and uppers of turned shoes, by detaching the welt guide from the carrier 118 and substituting a back gage of suitable construction therefor.

The welt guide of the machine illustrated except for its welt guiding action performs the same function as the back gage of the machine when fitted for sewing turned shoes, and the term "back gage" is often applied to the welt guide of an inseam sewing machine. Accordingly in the claims the term "back gage" is employed and applies to the welt guide of a machine fitted for welted shoe work as well as to the back gage of a machine fitted for sewing turned soles.

Having explained the nature and object of the invention and having specifically described a machine embodying the invention in its preferred form, what is claimed is:

1. A chain stitch sewing machine having, in combination, stitch forming devices including a hook needle, a looper, and mechanism acting automatically upon stopping the machine to sever the thread between the shoe and the machine and to grip the end of the thread leading from the supply before the needle is looped in the last cycle of operations, and to cause the needle to misloop during the last cycle.

2. A sewing machine having, in combination, stitch forming devices including a thread finger, means for actuating the thread finger to measure off thread during each cycle of operations comprising an actuating member, connections between said member and the thread finger, devices arranged to act on said connections upon stopping the machine to vary the movement of said thread finger, and a device arranged to cooperate with said thread finger in its action on the thread during its final movement.

3. A sewing machine having, in combination, stitch forming devices including a thread finger, means for actuating the thread finger to measure off thread during each cycle of operations comprising an actuating member, a toggle connecting said actuating member with the thread finger, means acting to change the position of the toggle upon stopping the machine to vary the movement of the thread finger, and a device arranged to cooperate with the thread finger in its action on the thread during its final movement.

4. A sewing machine having, in combination, stitch forming devices including a thread finger, means for actuating said thread finger to measure off thread during each cycle of operations comprising an actuating member, a toggle connecting said actuating member with the thread finger, means for maintaining the toggle in a straightened condition during the normal operation of the machine, means acting to break the toggle upon stopping the machine to vary the movement of the thread finger, and a device arranged to cooperate with the thread finger in its action upon the thread during its final movement.

5. A sewing machine having, in combination, stitch forming devices including a thread finger, means for actuating the thread finger to measure off thread during each cycle of operations, and a device arranged to cooperate with the thread finger to grip the thread upon stopping the machine.

6. A sewing machine having, in combination, stitch forming devices including a thread finger, means for actuating the thread finger to measure off thread during each cycle of operations, and a device cooperating with the thread finger to sever the thread upon stopping the machine.

7. A sewing machine having, in combination, stitch forming devices including a thread finger, means for actuating the thread finger to measure off thread during each cycle of operations, a thread gripping jaw, a thread cutting knife, and means for actuating the thread finger to grip the thread against the gripping jaw, and to draw the thread across the thread cutting knife to sever the same upon stopping the machine.

8. A sewing machine having, in combination, stitch forming devices, a main shaft from which said devices are operated, stopping devices for the shaft, means for throwing the stopping devices into operation comprising a lock bolt, a lock bolt carrier, devices for gripping and severing the thread, and means thrown into operation by the movement of the carrier to actuate said gripping and severing devices to grip and sever the thread upon stopping the machine.

9. A sewing machine having, in combination, stitch forming devices including a take-up, a thread gripping device for holding the thread during the first part of the seam formation, and means including a ratchet for actuating the thread gripping device to release the thread upon starting the machine.

10. A sewing machine having, in combination, stitch forming devices including a take-up, a cam lever for actuating the take-up, a thread gripping device for holding the thread during the first part of the seam formation, and means including a ratchet device actuated from the take-up cam lever for actuating the thread gripping device to release the thread upon starting the machine.

11. A sewing machine having, in combination, stitch forming devices including a curved needle, a needle carrier, bearing studs for the needle carrier, a sleeve in which one of said bearing studs is journaled, a needle guide carrier mounted on the sleeve, a needle guide secured to the carrier, and bearings for said sleeve and for the other of said bearing studs.

12. An inseam shoe sewing machine having, in combination, stitch forming and work feeding devices, a back gage, a back gage carrier, a support for the carrier movably mounted to permit the carrier to move forwardly and rearwardly and in the direction of feed, a universal joint connecting the carrier with the support, and means for actuating and controlling the carrier.

13. An inseam shoe sewing machine having, in combination, stitch forming and work feeding devices, including an oscillating curved needle, a back gage mounted to move forwardly and rearwardly and to swing in the direction of feed and in an arc substantially concentric with the arc of needle movement, and means for actuating and controlling the back gage.

14. An inseam shoe sewing machine having, in combination, stitch forming and work feeding devices, a back gage movable in the direction of feed, a back gage carrier, a forwardly and rearwardly swinging support for the carrier, a universal connection between the carrier and support, and means for actuating and controlling the carrier.

15. An inseam shoe sewing machine having, in combination, stitch forming and work feeding devices, a back gage, a forwardly and rearwardly swinging support for the back gage, a contact face formed on the support, a locking lever having an eccentric face for engagement with said contact face to lock the back gage in position, and means for actuating the locking lever to lock the back gage in position during each cycle of operations of the stitch forming and work feeding devices and to unlock the back gage to permit relative movement of the back gage and work in the line of feed.

16. An inseam shoe sewing machine having, in combination, stitch forming and work feeding devices, a back gage, a back gage carrier, a support on which the carrier is pivoted to swing laterally in a plane substantially parallel with the line of feed, a laterally movable slide acting on the carrier to swing the same in said plane, and means for actuating the slide.

17. An inseam shoe sewing machine having, in combination, stitch forming and work feeding devices, a back gage, a back gage carrier, a forwardly and rearwardly swinging support for the carrier, a universal joint connecting the carrier and the support, a laterally movable slide acting on the carrier to swing the same laterally relatively to said support in a plane substantially parallel with the line of feed, a universal and sliding connection between the carrier and the slide, and means for reciprocating the slide.

18. An inseam shoe sewing machine having, in combination, stitch forming and work feeding devices, a back gage, means for moving the back gage in the direction of feed and for back feeding the gage, mechanism for yieldingly pressing the back gage into engagement with the work during the back feeding movement thereof, and mechanism for locking the back gage in position.

19. An inseam shoe sewing machine having, in combination, stitch forming devices, a channel guide, a back gage, mechanisms for actuating the channel guide and for reciprocating the needle and back gage in the direction of the line of feed to feed the shoe continuously, mechanism for yieldingly pressing the back gage into engagement with the work during the back feeding movement of the gage, and means for locking the back gage in position.

20. A sewing machine having, in combination, stitch forming devices, a thread engaging device, a toggle, connections between the toggle and the thread engaging device, a cam lever normally oscillating idly, a second lever, means for connecting the levers, and means controlled from the second lever for actuating the toggle to cause the thread engaging device to perform its operation on the thread.

21. A sewing machine having, in combination, stitch forming devices, a thread severing device, a toggle, connections between the thread severing device and the toggle, and means for actuating the toggle to cause the thread severing device to perform its operation on the thread.

22. A sewing machine having, in combination, stitch forming devices, thread gripping and severing devices, a cam lever normally oscillating idly, and normally inactive connections between the cam lever and the thread gripping and severing devices rendered active upon stopping the machine for actuating said devices to grip and sever the thread.

23. A sewing machine having, in combination, stitch forming devices, thread gripping and severing devices, a cam lever normally oscillating idly, stopping mechanism comprising a lock bolt, a lock bolt carrier, and normally inactive connections between the cam lever and the thread gripping and severing devices controlled from the lock bolt carrier and rendered active upon stopping the machine for actuating said devices to grip and sever the thread.

24. An inseam shoe sewing machine having, in combination, stitch forming devices, a back gage, devices for stopping the machine comprising a lock bolt, a lock bolt carrier, and means operated from the lock bolt carrier for retracting the back gage upon stopping the machine.

25. An inseam shoe sewing machine having, in combination, stitch forming devices, a back gage, a back gage carrier movable to carry the back gage toward and from the shoe and in the direction of the line of feed, devices for stopping the machine comprising a lock bolt, a lock bolt carrier, and a normally inactive pivoted lever arranged to engage a lug on the back gage carrier and mechanism actuated from the lock bolt carrier for swinging the lever to retract the back gage upon stopping the machine.

26. An inseam shoe sewing machine having, in combination, stitch forming devices, a back gage, mechanism for locking and unlocking the back gage during each cycle of operations, means for stopping the machine and mechanism for unlocking and retracting the back gage upon stopping the machine.

27. An inseam shoe sewing machine having, in combination, stitch forming devices, a back gage, a back gage carrier, a locking lever for locking the carrier, means for stopping the machine, and means for successively actuating the lever to unlock the back gage and the carrier to retract the back gage upon stopping the machine.

28. An inseam shoe sewing machine having, in combination, stitch forming and work feeding devices, a back gage, a back gage carrier, a swinging support for the carrier, a locking segment formed on said support, a locking lever having an eccentric portion for engaging said locking segment, and connections for actuating the locking lever yieldingly in a direction to lock the back gage in position during each cycle of operations of the stitch forming and work feeding devices and positively in a direction to unlock the back gage to permit relative movement of the back gage and work in the line of feed.

29. An inseam shoe sewing machine having, in combination, stitch forming and work feeding devices, a back gage, a back gage carrier, a swinging support for the carrier, a universal connection between the carrier and the support, a spring for advancing the carrier, a slide for moving the carrier laterally in a plane substantially parallel with the line of feed, and a universal and sliding connection between the slide and the carrier.

30. A sewing machine having, in combination, stitch forming devices, a thread engaging device, stopping mechanism comprising a lock bolt, a lock bolt carrier, and normally inactive connections controlled from the lock bolt carrier and rendered active upon stopping the machine for causing the thread engaging device to act on the thread.

31. A chain stitch sewing machine having, in combination, stitch forming devices including a hook needle, a looper, mechanism acting automatically upon stopping the machine to sever the thread between the shoe and the machine, and means for causing the looper to lay the thread about the needle between the barb and the point thereof so that the needle will free itself from the thread by its retracting movement.

32. A chain stitch sewing machine having, in combination, stitch forming devices including a hook needle, a looper, mechanism for severing and gripping the thread before the needle is looped in the last cycle of operations upon stopping the machine, and for causing the needle to come to rest out of engagement with the work in a condition free of thread.

33. An inseam shoe sewing machine having, in combination, stitch forming devices including a curved hook needle, a channel guide roll, means for rotating the roll, and means whereby the roll may be adjusted in a direction radially of the needle.

34. An inseam shoe sewing machine having, in combination, stitch forming devices including a curved hook needle, a channel guide roll, a shaft on which the roll is mounted, means for rotating the shaft, a bushing in which the shaft is journaled mounted for adjustment to adjust the roll in a direction radially of the needle, and means for securing the bushing in adjusted position.

35. An inseam shoe sewing machine having, in combination, stitch forming devices, a channel guide, a back gage, means for reciprocating the back gage in the direction of the line of feed, means for pivotally supporting the back gage so that during its advancing movement in the direction of feed the back gage swings in an arc approaching the channel guide, means for yieldingly engaging the back gage with the work, and means for locking the back gage in position during its advancing movement.

36. An inseam shoe sewing machine having, in combination, stitch forming devices, a channel guide, a back gage, means for reciprocating the back gage in the direction of the line of feed, means for supporting and actuating the back gage so that during its advancing movement in the direction of feed it exerts a squeezing action on the stock intermediate the back gage and the channel guide.

37. A sewing machine having, in combination, stitch forming devices including a thread finger, means for actuating the thread finger to measure off thread during each cycle of operations, a device arranged to cooperate with the thread finger to grip the thread upon stopping the machine, and means for actuating the thread finger and said device to give up thread to the stitch forming devices during the first cycle of operations upon starting the machine.

38. A sewing machine having, in combination, stitch forming devices including a thread finger, means for actuating the thread finger to measure off thread during each cycle of operations, a device arranged to cooperate with the thread finger to grip the thread upon stopping the machine, and means for actuating the thread finger and said device to measure off thread during the first cycle of operations upon starting the machine.

39. A sewing machine having, in combination, stitch forming devices including a needle, a needle carrier, bearing studs extending laterally therefrom, means for oscillating the needle carrier about the axis of the bearing studs, pivotally mounted levers arranged to act on the ends of the bearing studs, and means for actuating the levers to reciprocate the needle carrier to impart feed and return movements to the needle.

40. A sewing machine having, in combination, stitch forming devices including a needle, a needle carrier, bearing studs extending laterally therefrom, means for oscillating the needle carrier about the axis of the bearing studs, pivotally mounted levers arranged to act on the ends of the bearing studs to reciprocate the needle carrier to impart feed and return movements to the needle, an actuating connection between the levers, and a cam for actuating one of the levers.

41. A sewing machine having, in combination, stitch forming devices including a needle, a needle carrier, bearing studs extending laterally therefrom, means for reciprocating the needle carrier axially to impart feed and return movements to the needle, and means for oscillating the needle carrier about the axis of the bearing studs comprising a bell crank, a link connecting the bell crank and needle carrier, a rotating crank and a pitman connecting the crank and bell crank.

42. A sewing machine having, in combination, stitch forming devices including a needle, a needle carrier, bearing studs extending laterally therefrom, means for reciprocating the needle carrier axially to impart feed and return movements to the needle, and means for oscillating the needle carrier about the axis of the bearing studs comprising a rotating crank and suitable connections between the crank and needle carrier.

ALFRED R. MORRILL.